March 20, 1945.  H. F. WILMS  2,371,661
INDUSTRIAL TRUCK
Filed Aug. 25, 1943  6 Sheets-Sheet 1

Fig.1

INVENTOR.
HENRY F. WILMS.

March 20, 1945.  H. F. WILMS  2,371,661
INDUSTRIAL TRUCK
Filed Aug. 25, 1943  6 Sheets-Sheet 2

INVENTOR.
HENRY F. WILMS.

March 20, 1945.　　　H. F. WILMS　　　2,371,661
INDUSTRIAL TRUCK
Filed Aug. 25, 1943　　　6 Sheets-Sheet 3

INVENTOR.
HENRY F. WILMS.

Patented Mar. 20, 1945

2,371,661

UNITED STATES PATENT OFFICE 2,371,661

INDUSTRIAL TRUCK

Henry F. Wilms, Cleveland, Ohio, assignor to The Elwell-Parker Electric Company, Cleveland, Ohio, a corporation of Ohio Application August 25, 1943, Serial No. 499,942

22 Claims. (Cl. 214—82)

This invention relates, as indicated, to industrial trucks, but has reference more particularly to a truck of this character which has been designed particularly for use in handling stacked cartons of merchandise and sacks of bulk material, such as flour, potatoes, and the like.

Industrial lift trucks have heretofore been designed in which a load carrying skid is retained on the prongs or forks of a vertically reciprocable elevating mechanism, while the load is being unloaded or pushed from the pallet by means of a pusher plate or like structure.

Such trucks have not proved entirely satisfactory, due to the fact that in all cases, the pusher structure is operated hydraulically, necessitating carrying on the truck suitable means for such hydraulic operation, in addition to the usual battery for the operation of the truck.

Another drawback to the use of such trucks is the fact that the power developed through hydraulic operation of the pusher structure, for the purpose of moving the pusher structure in relation to the truck or the truck in relation to the pusher structure has not always proved to be sufficient nor adequate, particularly in the handling of heavy loads.

Other shortcomings of such trucks are the failure to provide means for preventing a certain amount of friction between the load and the pusher in the last stages of unloading, which frequently results in some damage to the bottom units of the load, the failure to provide satisfactory means for latching the prongs or forks of the elevator to the pallet, and the failure to provide a centralized control to facilitate the manipulation of the truck relative to the load transferring action of the load handling means and a lack of adequate means for automatically cutting off and on the power required to move the pusher structure.

The present invention has as its primary object the provision of an industrial truck of the character described in which all or substantially all of the aforesaid disadvantages and defects in construction and operation have been obviated.

More specifically, the truck of the present invention has incorporated therein numerous highly advantageous features among which the following may be enumerated.

(1) A pusher or pusher structure of a rugged and well balanced construction;

(2) Mechanism for operating the pusher, which is located as close to the pusher as possible and adequate for the handling of very heavy loads;

(3) A unique and highly satisfactory latching mechanism for retaining the pallet on the prongs or forks of the elevator;

(4) Means for eliminating friction between the pusher and the load during the entire unloading operation;

(5) Means for automatically cutting the pusher operation off at predetermined limits, and (6) Means for permitting self-adjustment of the pusher when engaging a load at an angle.

Other objects and advantages of the invention will be apparent during the course of the following description.

In the accompanying drawings, forming a part of this specification, and in which like numerals are employed to designate like parts throughout the same.

Figure 1:
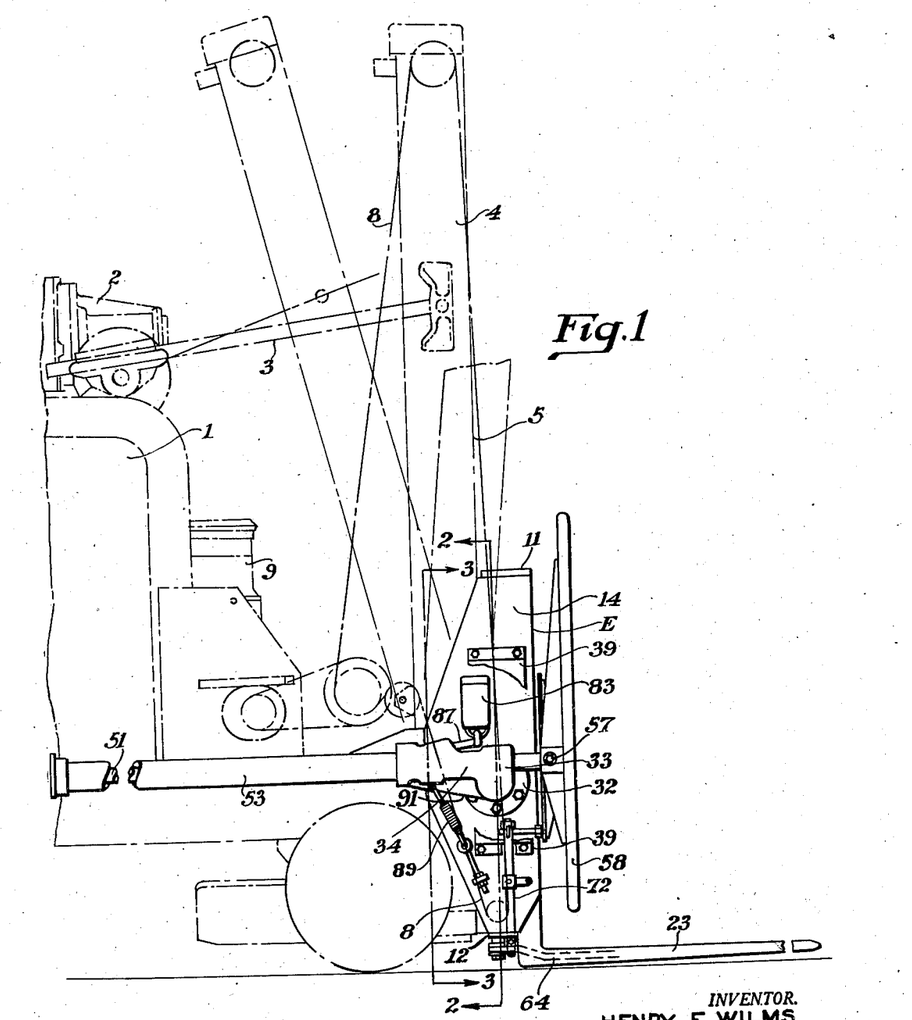
Fig. 1 is a fragmentary side elevation of an industrial truck embodying the novel features of the present invention.
Figure 12:
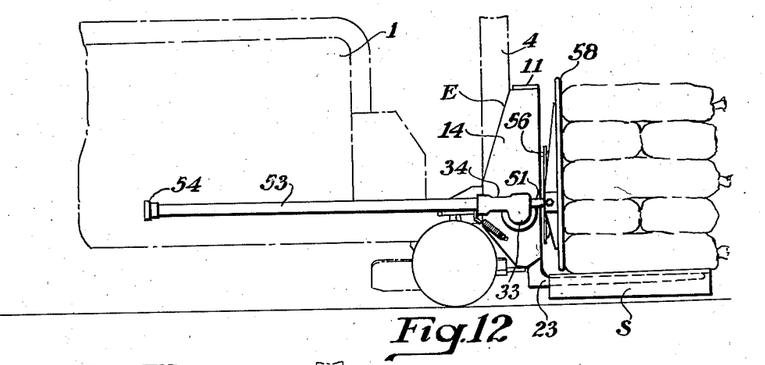
Fig. 12 is a view, showing in a more or less diagrammatic manner, the position of the various parts of the truck just prior to unloading the load from the pallet.
Figure 13:
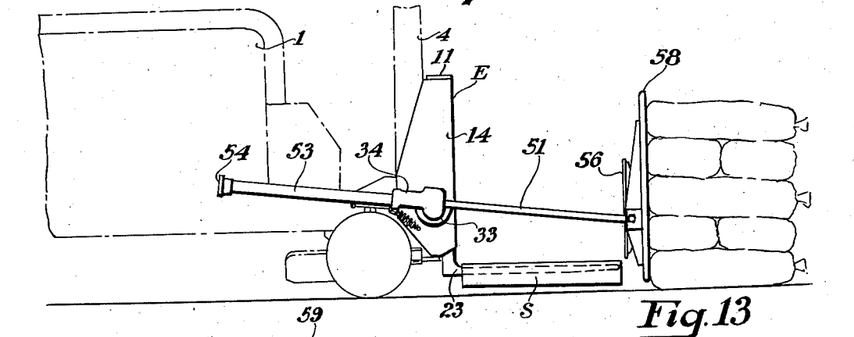
Fig. 13 is a view similar to Fig. 12, but showing the last stages of the unloading operation.

Referring more particularly to Figs. 1, 12 and 13 of the drawings, it will be seen that an industrial truck such as is best adapted for use in conjunction with the novel features of the present invention, generally comprises a battery 1 which is used to furnish power for a motor 2, which, through racks 3, functions to tilt a frame 4, to various positions, as indicated in Fig. 1. The frame 4 comprises spaced channels 5 (see Fig. 3a) having filler strips 6, which serve as tracks or guides for the wheels 7 of a vertically reciprocable elevator, generally designated E.

The elevator is propelled up or down along the frame 4 by means of cable or chains 8 (Fig. 1), the ends of which are attached in any suitable manner to the elevator E, such chains or cables being driven by a motor 9, which derives its motive power from the battery 1.

Figure 2:
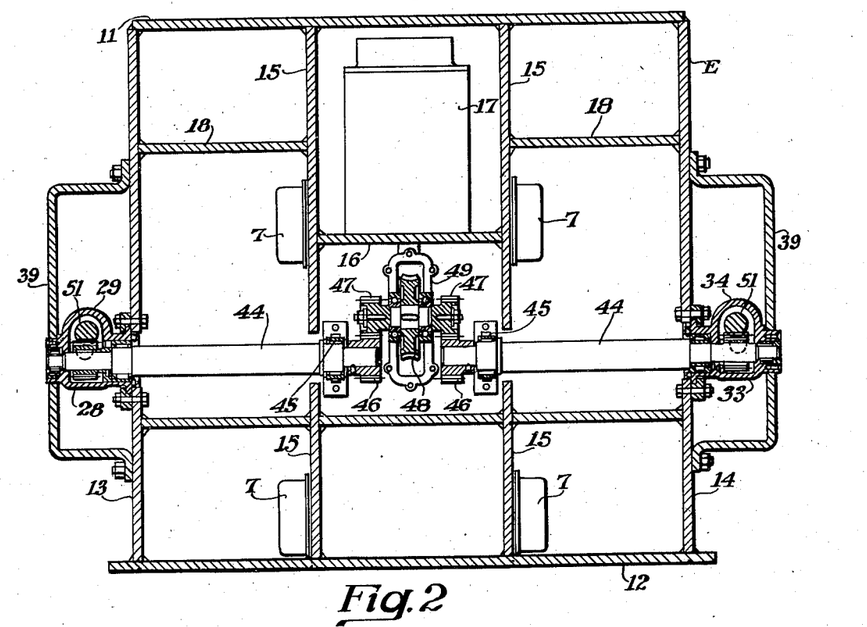
Fig. 2 is a cross-sectional view taken approximately on the line 2—2 of Fig. 1.
Figures 3, 3A:
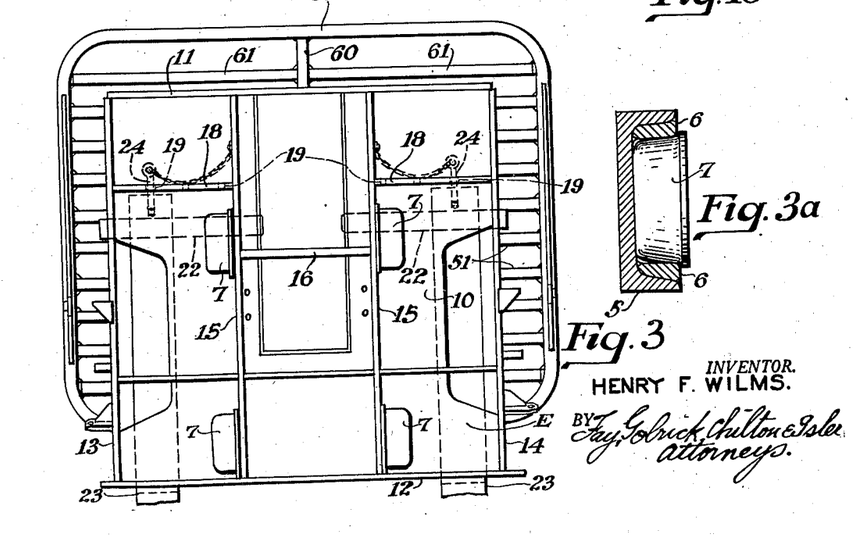
Fig. 3 is a rear elevational view of the elevator and pusher structure, as viewed in the direction indicated by the line 3—3 of Fig. 1.
Fig. 3a is a fragmentary detail, showing the manner in which the elevator is guided in its vertical movements.
Figures 4, 5:
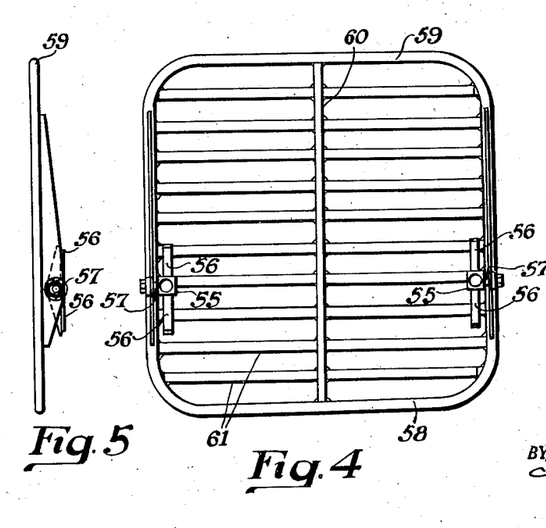
Fig. 4 is a rear elevation of the pusher screen.
Fig. 5 is a side elevation of the pusher screen.
Figure 6:
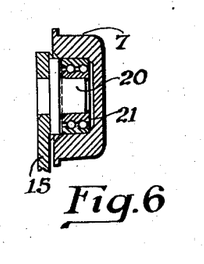
Fig. 6 is a fragmentary cross-sectional view, showing the manner in which the elevator guiding wheels are mounted on the elevator frame.

The elevator E, as best shown in Figs. 2 and 3, includes a frame consisting of a body plate 10, a top plate 11, a bottom plate 12, side plates 13 and 14, and a pair of intermediate plates 15, which extend rearwardly from the plate 10 and are disposed in planes parallel with the side plates 13 and 14. Extending between the intermediate plates 15 is a shelf or bracket 16 which serves to support a motor 17. Extending between the intermediate plates 15 and the side plates 13 and 14 are plates 18 having a plurality of longitudinally spaced openings 19 therein, which serve a purpose to be presently described. The intermediate plates 15 have welded thereto stub shafts 20 (Fig. 6) upon which roller bearings 21 are mounted for the frictionless support of the wheels 7, which, as previously stated, are guided by the channels 5 of the frame 4 during the upward or downward movement of the elevator.

Figure 8:
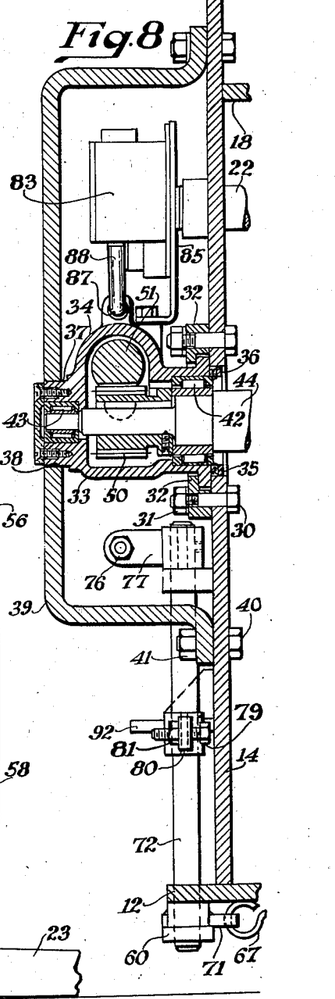
Fig. 8 is a cross-sectional view, taken on the line 8—8 of Fig. 7.

The elevator frame is provided with a pair of transversely extending shafts 22 (see Figs. 3, 8 and 10) which serve as supports for a pair of laterally spaced forks 23, which are restrained against lateral movement by means of dogs 24 which extend through the apertures 19 in the plates 18 of the elevator frame and into recesses in the upper ends of the forks. By providing a plurality of recesses 19 in the plates 18, adjustment of the forks along the shafts 22 may be made when desired. The function of the forks 23 will be presently described.

Figure 7:
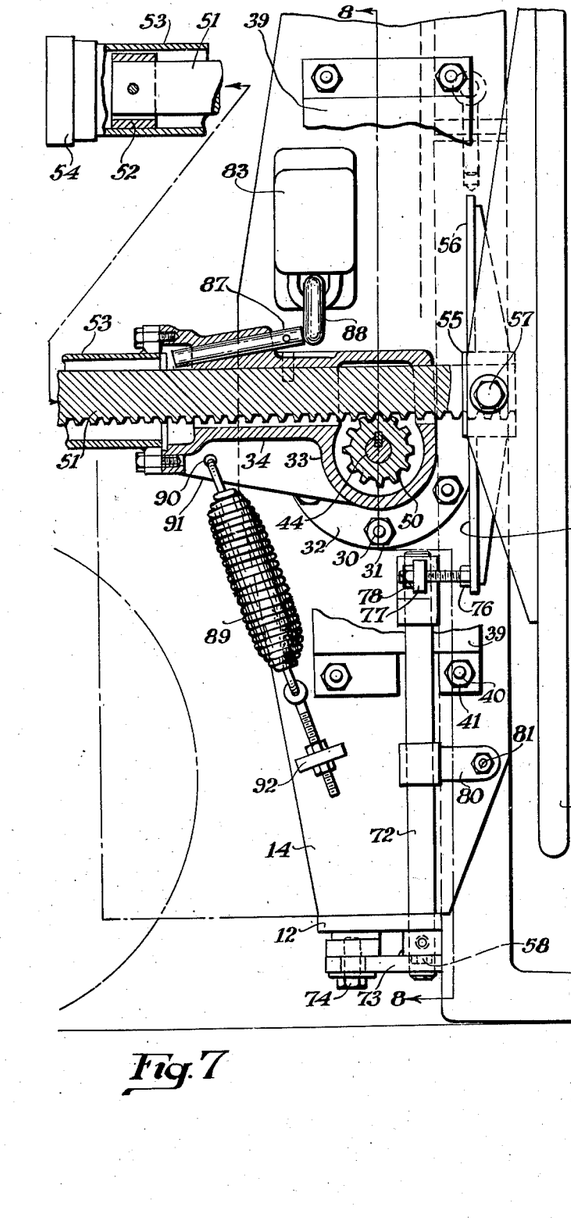
Fig. 7 is a view, partly in cross-section and partly in elevation, showing the right side of the elevator and pusher structure.
Figures 9, 10:
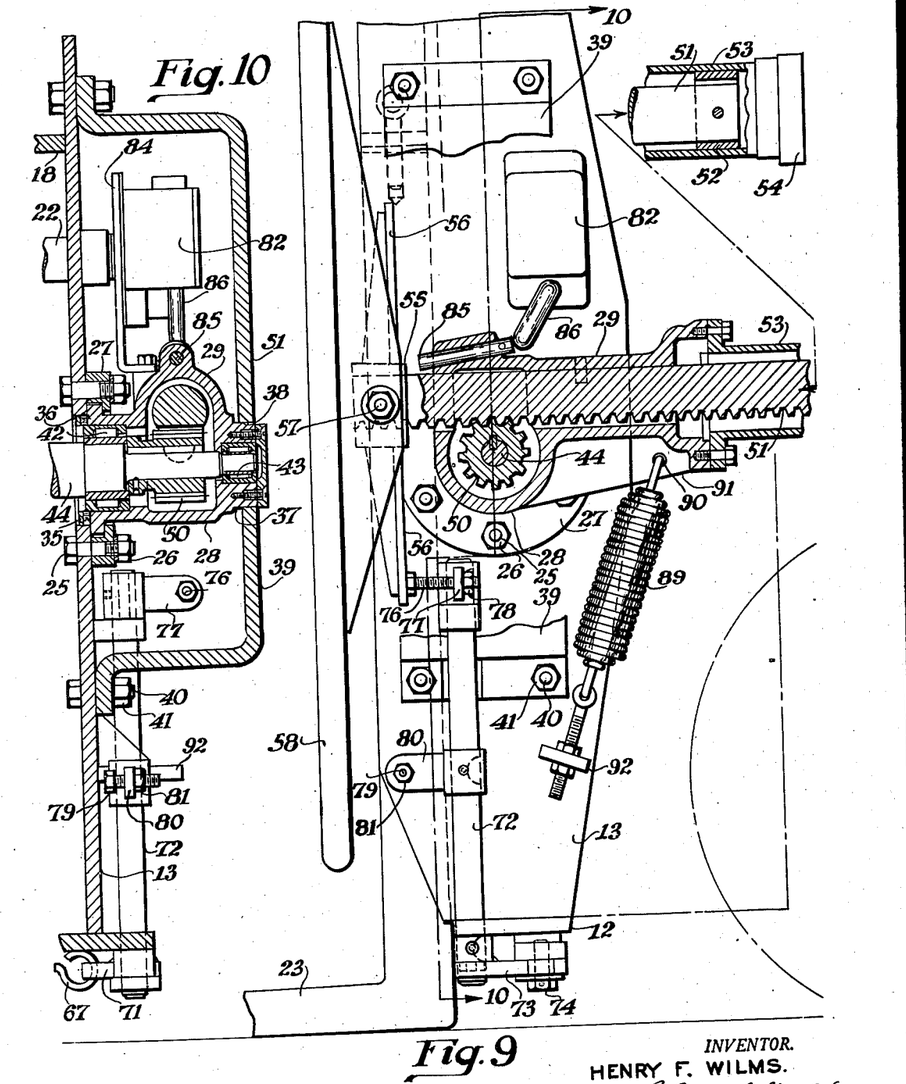
Fig. 9 is a view similar to Fig. 7 but of the left side of the elevator and pusher structure.
Fig. 10 is a cross-sectional view, taken on the line 10—10 of Fig. 9.

Secured to the plate 13, as by means of bolts 25 and nuts 26, is a split flange 27, which serves to secure to the plate 13 a rack case 28 of generally cylindrical form and having a tubular portion 29 extending rearwardly and tangentially therefrom (Fig. 9). Similarly, the plate 14 has secured thereto, as by means of bolts 30 and nuts 31, a split flange 32, which serves to secure to the plate 14 a rack case 33 of generally cylindrical form and having a tubular portion 34 extending rearwardly and tangentially therefrom (Fig. 7).

In order to more effectively support the rack cases 28 and 33 on the frame, each of the rack cases is provided at its inboard end with a tubular extension 35 which extends into and substantially fills a circular opening 36 in the plates 13 and 14, and at its outboard end with a tubular extension 37 which extends into and substantially fills a circular opening 38 in an outboard support 39, which is secured to the plates 13 and 14 by means of bolts 40 and nuts 41.

Journalled in the rack cases 28 and 33, as by means of suitable roller bearings 42 and 43 are shafts 44, the inboard ends of which are journalled in roller bearings 45 which are supported by the plate 10 of the elevator frame.

The shafts 44 have rigidly secured to their inboard ends gears 46 (Fig. 2) which are driven by pinions 47, which, in turn, are driven by a worm wheel 48, driven by a worm (not shown), but which is driven by the shaft of the motor 17. The worm and worm wheel are encased in a suitable housing 49.

The shafts 44 have keyed thereto, at points intermediate the bearings 42 and 43, pinions 50, rotation of which imparts reciprocatory movement to racks 51. The racks 51 extend through the tubular portions 29 and 34 of the rack cases 28 and 33 and have secured to the rear ends thereof collars 52, whereby the racks may be slid along the inner walls of tubular housings 53, which are secured to and extend rearwardly from the rear ends of the tubular portions 29 and 34 of the rack cases. The housings 53 are closed at the rear, as by means of caps 54. The housings 53 thus serve not only to conceal the racks 51 when the latter are in retracted position, but to prevent access of dirt and dust thereto.

Secured to the forward ends of the racks 51 are latch trips comprising hub portions 55 and portions 56 of T-shaped cross-section, extending from the upper and lower faces of said hub portions. The hub portions 55 of the latch trips, to which the racks are directly secured, are pivotally secured, as by means of pivot pins 57, to a pusher or screen 58. The pusher 58 consists of a somewhat rectangular frame 59, a vertical frame member 60 and a multiplicity of vertically-spaced, transversely extending frame bars 61. The pivotal connection of the pusher 58 to the latch trip hubs 55 permits a limited tilting movement of the pusher relatively to the racks for a purpose to be presently described.

The forks 23 are so designed as to be insertable into the usual load-carrying skid or pallet for the support and transportation of which trucks of the character described are designed. Such skids or pallets are usually constructed in the manner shown in Figs. 11, 12 and 13 and consist of an upper board B, a lower board L, sides S, and a central longitudinally extending vertically disposed partition P, all of these parts usually formed of wood or like material. For the purposes of the present invention, the upper board B will be covered with a smooth sheet of metal or other material upon which a load may be slid, and the central partition P will be provided at opposite sides of the rear portion thereof, with metallic plates P' to which a plurality of longitudinally spaced angles A are secured. Each of the forks 23 is also provided with a triangular shaped cleat 62 on its inboard side at a point adjacent the rear of the fork, each of such cleats having a sloped side 63.

Mechanism is also provided for retaining the pallet which has been described on the forks 23 while a load is being pushed off the pallet by the pusher 58. Such mechanism includes a pair of latch bars 64 having hook-shaped forward ends 65, the latch bars being pivotally connected as at 66, to the bottom plate 12 of the elevator frame. The latch bars are normally maintained in the position shown in solid lines in Fig. 11, due to the engagement of the lower portions 56 of the latch trips with screws 76. A coil spring 67 is secured at one end to an eyebolt 68 which is adjustably secured to a bracket 69 which, in turn, is secured to a link 70. The other end of the spring 67 is secured to one arm 71 of a bell-crank lever, which is keyed to the lower end of a vertically extending rock shaft 72, which is also supported by said lever. The other arm 73 of the bell-crank lever is pivotally connected, as by a pivot pin 74, to one end of the link 78, the other end of which is pivotally connected, as by a pin 75, to the rear end of the latch bar 64.

Each of the shafts 72 is further provided with two vertically-spaced stops, which serve a purpose to be hereinafter described. One of these stops consists of a screw 76 which is mounted on a lever 77 which is keyed to the upper end of the shaft 72. The screw 76 may be locked in adjusted position by means of a lock nut 78. The head of the screw 76 is designed to coact with the latch trip 56, as stated above.

The other stop consists of a screw 79, which is mounted on lever 80 which is keyed to the shaft 72 at a point intermediate the ends of the shaft. The screw 79 may be locked in adjusted position by means of a lock-nut 81, and extends at right angles to the screw 76. The head of the screw 70 is designed to coact with the side plates 13 or 14, as the case may be, of the elevator frame.

The motor 17 is of the reversing type, and adapted to be started or stopped automatically. For this purpose, limit switches 82 and 83 are provided, being mounted on brackets 84 and 85 respectively, which, in turn, are secured to the tubular portions 29 and 34 of the rack cases.

The operation of the truck will now be described in detail, particularly with reference to the loading of a freight or box car with sacks of flour or the like.

It will be assumed that the skid or pallet is loaded with sacks of flour as shown in Fig. 12, which sacks are to be transported from the warehouse or mills to the inside of a box car. With the skid thus loaded, the operator of the truck will cause the truck to approach the loaded pallet in such a manner as to cause the prongs or forks 23 to enter the spaces of the skid between the central partition P and the sides S thereof, the latch bars being disposed at such time in the solid line position shown in Fig. 11.

Should the operator misjudge the position of the forks with respect to the aforesaid spaces in the skid at the time of such entry, the surfaces 65 of the cleats 62 will engage the partition P of the skid, thereby forcing the skid to a position which will compel entry of the forks into the aforesaid spaces. In other words, the cleats will serve to properly align the forks with the skids.

Figures 11, 14:
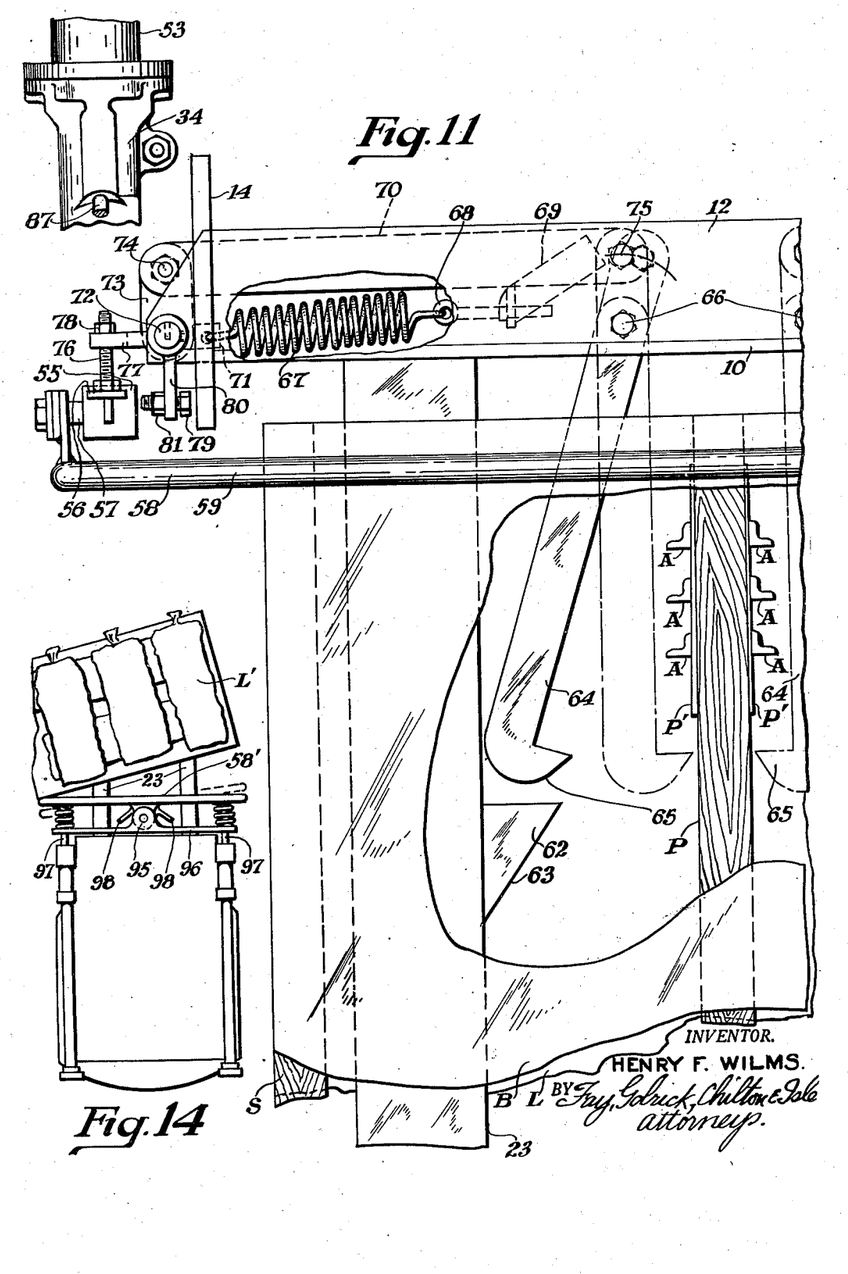
Fig. 11 is a fragmentary view, showing the latching mechanism for the pallet, and associated parts.
Fig. 14 is a view, showing a modified form of the invention, in which provision is made for permitting self-adjustment of the pusher when engaging a load at an angle.

When the elevator frame E has moved to approximately the position shown in Fig. 11 in relation to the skid, the motor 9 is then energized, so as to elevate the skid to the desired load-carrying position, the frame 4 being tilted rearwardly if desired so as to insure against any of the bags falling from the skid.

Should the operator, after he has transported the load to the desired position, wish to leave the skid with the load, he will merely deposit the skid on the floor or on a previously deposited load, and back the truck away, the friction of the skid relatively to the floor or to the top of the previously deposited load serving to permit this without necessitating the use of the pusher 58. In other words, the latch bars 64 will remain in the solid line position of Fig. 11.

Should the operator, after he has transported the load to the desired position, as for example, into a freight car, wish to deposit the load, but retain the pallet on the forks, he will start the motor 17 so as to cause the pusher 58 to recede from the elevator E, and the initial effect of this will be to move the latch trips 56 away from the heads of screws 76, thereby permitting the springs 67 to move the latch bars 64 to the dotted line position shown in Fig. 11, the motor 17 then operating to cause the pusher 58 to push the load off the pallet, as shown in Fig. 13, the hooked ends 65 of the latch bars 64 engaging one or the other of the pairs of angle bars A during such pushing movement.

If the load is to be deposited against the wall of the freight car or against a previously deposited load, the pusher screen will be maintained stationary but the truck moved away therefrom, with the same effect as though the truck remained stationary, and the pusher moved.

In either case, after the load has been moved to the position shown in Fig. 13, the push rod 87, which is slidably mounted on the rack case 33, will be engaged by the collar 52 at the rear end of the rack and slid forwardly sufficiently to open the limit switch 83 by movement of the switch handle 88 to the right, as viewed in Fig. 7, thereby stopping the motor 17.

As the last portion of the load leaves the pallet, the pusher 58 moves with such portion of the load to the lowered position shown in Fig. 13, so that there is no frictional movement between the sacks and the pusher which might tear or otherwise damage the sacks. This movement is permitted by virtue of the fact that the rack cases 28 and 33 are rotatable within the split flanges 27 and 32, thereby permitting the racks 51 and their housings 53 to be tilted as shown in Fig. 13.

In order to restore the pusher 58 to its normal position after being backed away from the deposited load, coil springs 89 are provided, which are connected as at 90 to webs 91 which are formed integrally with the rack cases 28 and 33, and are connected at the other end to lugs 92 which extend from the side plates of the elevator frame.

Due to the pivotal connection of the pusher 58 to the racks 51, the pusher retains its vertical position in moving from the position shown in Fig. 12 to the position shown in Fig. 13, so that the pusher, during the entire unloading operation, snugly engages the rear face of the load, a highly desirable condition.

The screws 79 may be adjusted so that by their engagement with the plates 13 and 14, they serve to prevent the latch bars 64 from moving beyond the dotted line position shown in Fig. 11.

The motor 17 may then be operated to retract the pusher 58 to the position shown in Fig. 11, but in order to avoid retraction beyond this position, a push rod 85 (Fig. 9) which is slidably mounted on the rack case 28 is caused to be engaged by the hub portion 55 of one of the trips 56 and slid rearwardly sufficiently to open the limit switch 82 by movement of the switch handle 86 to the right, as viewed in Fig. 9, thereby stopping the motor 17.

Referring to Fig. 14, it will be seen that the pusher screen 58', in this case is mounted on a vertically extending pivot shaft or pin 95, supported on a cross-bar 96, which joins the forward ends of the rack bars 97. This permits the pusher screen 58' to rotate to a limited extent about the axis of the shaft 95, when the pusher screen engages a load L' at an angle, thereby equalizing the pressure or strain on the rack bars, and consequently on the operating mechanism. The rotation of the pusher screen incidental to its engagement of the load at an angle is indicated by the dotted lines. The extent of this rotation in either direction is limited by the provision of stops 98, and springs 99 are interposed between the pusher screen 58' and the cross-bar 96 to cushion the impact resulting from engagement of the pusher with the load, as well as to restore the pusher to its normal position, which is parallel with the bar 96.

It is thus seen that we have provided a truck having incorporated therein all of the desirable features which have hereinbefore been enumerated.

It will be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a truck of the character described, a reciprocally movable elevator structure, a pusher structure tiltably mounted on said elevator structure, and means for restoring said pusher structure to a normal position after being tilted relatively to the elevator structure.

2. In a truck of the character described, a reciprocally movable elevator structure, a pusher structure and rack and gear means for moving said pusher structure relatively to said elevator structure, said racks being tiltable in vertical planes relatively to said elevator structure.

3. In a truck of the character described, a vertically reciprocable elevator structure, a pusher structure, and means comprising an electric motor, racks and gears carried directly by said elevator structure for moving said pusher structure relatively to said elevator structure.

4. In a truck of the character described, an elevator structure, a pusher structure, and means for moving said pusher structure relatively to said elevator structure, said means including an electric motor, racks and gears mounted directly on said elevator structure.

5. In a truck of the character described, an elevator structure, a pusher structure disposed in advance of said elevator structure, and means for moving said pusher structure relatively to said elevator structure, said means including a motor mounted on said elevator structure, a pair of shafts journalled on said elevator structure and driven by said motor, pinions driven by said shafts, and racks mounted on said elevator structure and driven by said pinions, said racks being connected at one end to said pusher structure.

6. In a truck of the character described, an elevator structure, a pusher structure disposed in advance of said elevator structure, and means for moving said pusher structure relatively to said elevator structure, said means including a motor mounted on said elevator structure, a pair of shafts journalled on said elevator structure and driven by said motor, pinions driven by said shafts, and racks mounted on said elevator structure and driven by said pinions, said racks being tiltable about the axes of said pinions.

7. In a truck of the character described, an elevator structure, rack cases pivotally mounted on said elevator structure, pinions wholly enclosed within said cases, and racks extending through said cases and adapted to be driven by said pinions.

8. In a truck of the character described, an elevator frame, and rack cases mounted on the sides of said frame and rotatable in the plane of said sides.

9. In a truck of the character described, an elevator frame, rack cases mounted on the sides of said frame and rotatable in the plane of said sides, and tubular rack housings secured to said cases and extending along the sides of said truck.

10. In a truck of the character described, an elevator structure, a pusher structure movable between predetermined limits, means including a motor mounted on said elevator structure for moving said pusher structure relatively to said elevator structure, and means responsive to the movement of said pusher structure to said limits for deenergizing said motor.

11. In a truck of the character described, an elevator structure, a pusher structure movable between extreme positions relatively to said elevator structure, power means for effecting said movement, and means responsive to the movement of said pusher structure to said extreme positions for deenergizing said power means.

12. In a truck of the character described, a pusher structure movable between predetermined positions, power means for effecting said movement, limit switches for deenergizing said power means, and means responsive to movement of the pusher structure to said positions for actuating said switches.

13. In a truck of the character described, an elevator structure adapted for the support of a pallet, means for pushing a load from said pallet, latch bars pivotally mounted on said elevator structure and adapted to retain said pallet on said structure during removal of said load from the pallet, and means responsive to movement of said load pushing means for releasing said latch bars from said pallet.

14. In a truck of the character described, an elevator structure having forks mounted thereon, and cleats having sloping sides mounted on the sides of said forks, said cleats adapted for properly aligning said forks with a skid which is to be picked up by means of said forks.

15. In a truck of the character described, an elevator frame, rack cases mounted on the sides of said frame, said cases having tubular extensions, and means secured to the sides of said frame for supporting said tubular extensions.

16. In a truck of the character described, an elevator, a pusher structure, and means for moving said pusher structure relatively to said elevator structure, said means comprising racks pivotally movable relatively to said elevator structure.

17. In a truck of the character described, a vertically-reciprocable elevator, a pusher, means for moving said pusher structure relatively to said elevator, and means permitting vertical downward movement of said pusher relatively to said elevator when said pusher is substantially at its farthest position from said elevator.

18. In a truck of the character described, a vertically-reciprocable elevator having a substantially-horizontal load supporting portion, a pusher, means for moving said pusher relatively to said elevator and substantially parallel to said horizontal portion to remove loads supported by the latter, and means permitting vertical downward movement of said pusher at substantially the extreme limit of its movement from said elevator whereby the pusher remains in engagement with the load as the load descends.

19. In a truck of the character described, an elevator frame, rack cases mounted on the sides of said frame and rotatable in the plane of said sides from a position substantially perpendicular to the plane of said frame to a non-perpendicular position relatively to said plane, and spring means interconnecting said cases with said frame and adapted to restore said cases to said perpendicular position.

20. In a truck of the character described, an elevator structure for the support of a pallet, means for pushing a load from said pallet, latch bars pivotally mounted on said elevator structure and adapted for movement from an inoperative position to a position in which they retain said pallet on said structure during removal of said load from the pallet, means maintaining said latch bars in inoperative position at such time when said pushing means is substantially in completely retracted position, and means responsive to movement of said pushing means from said retracted position for moving said latch bars to the pallet retaining position.

21. In a truck of the character described, a vertically-reciprocable elevator structure, and a pusher structure movable relatively to said elevator structure, said pusher structure comprising a load-engaging element mounted for limited pivotal movement about a vertical axis.

22. A truck as defined in claim 21, and means resiliently cushioning the pivotal movement of said load-engaging element.

HENRY F. WILMS.